No. 743,838. PATENTED NOV. 10, 1903.
T. I. DUFFY.
CARPET SWEEPER.
APPLICATION FILED SEPT. 19, 1902.
NO MODEL. 4 SHEETS—SHEET 1.

Witnesses:
H. G. Barrett
Frank Exline

Inventor
Thomas I. Duffy
by Poole & Brown
his Attorneys

No. 743,838. PATENTED NOV. 10, 1903.
T. I. DUFFY.
CARPET SWEEPER.
APPLICATION FILED SEPT. 19, 1902.
NO MODEL. 4 SHEETS—SHEET 3.

Witnesses:-
Carl M. Crawford
William H. Hall

Inventor:-
Thomas I. Duffy
by Poole & Brown
his Attorneys

No. 743,838. PATENTED NOV. 10, 1903.
T. I. DUFFY.
CARPET SWEEPER.
APPLICATION FILED SEPT. 19, 1902.
NO MODEL. 4 SHEETS—SHEET 4.

Witnesses:—
Carl S. Crawford
William L. Hall

Inventor:—
Thomas I. Duffy
by Pooler Brown
his Attorneys

No. 743,838.

Patented November 10, 1903.

UNITED STATES PATENT OFFICE.

THOMAS I. DUFFY, OF CHICAGO, ILLINOIS, ASSIGNOR, BY DIRECT AND MESNE ASSIGNMENTS, TO ABNER CROSSMAN, TRUSTEE, OF CHICAGO, ILLINOIS.

CARPET-SWEEPER.

SPECIFICATION forming part of Letters Patent No. 743,838, dated November 10, 1903.

Application filed September 19, 1902. Serial No. 123,961. (No model.)

*To all whom it may concern:*

Be it known that I, THOMAS I. DUFFY, of Chicago, in the county of Cook and State of Illinois, have invented certain new and useful Improvements in Carpet-Sweepers; and I do hereby declare that the following is a full, clear, and exact description thereof, reference being had to the accompanying drawings, and to the letters of reference marked thereon, which form a part of this specification.

This invention relates to improvements in carpet-sweepers; and the invention consists in the matters hereinafter set forth, and more particularly pointed out in the appended claims.

First referring to the general construction of a carpet-sweeper embodying my invention, it will be observed that the frame and casing of said carpet-sweeper are made of metal or like rigid material, and the principal parts of said frame and casing are made by cutting and stamping operations and with the use of little or no cast parts.

The sweeper consists generally of a main frame having rigidly-connected side and end members, a rotative brush, which is rotatively mounted at its ends in the end members of the frame, and upper and lower casings, which are detachably secured to and carried by the frame, the lower frame being constructed to provide sweepings-pans on each side of the brush in position to receive the sweepings from said brush. The supporting-wheels for the sweeper are carried by the end members of the frame, and the bail is connected with the frame, whereby the frame and wheels receive all the weight and pressure brought upon the sweeper, and none of such weight and pressure is transmitted to the casings.

Figure 2:
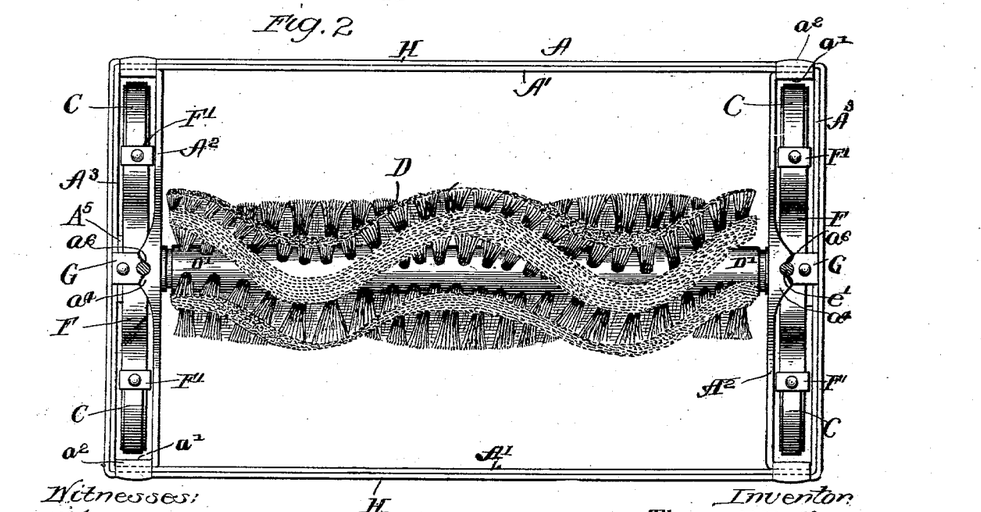
Fig. 2 is a plan view of the sweeper-frame and the brush shown in position therein.
Figure 3:
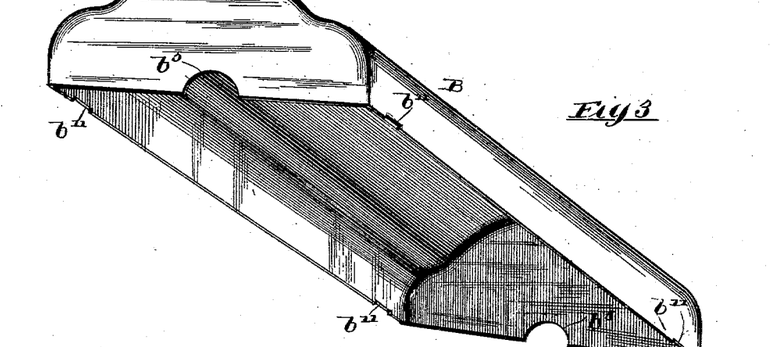
Figs. 3 and 4 are perspective views of the two-part casing of the machine, said parts of the casing being separated to illustrate the construction thereof.

Referring now in detail to the several parts of the sweeper, reference being had to the accompanying drawings, A, Fig. 2, designates as a whole the metal frame of the machine, and B B', Fig. 3, designates the upper and lower casings, which are supported on the frame. The upper casing is designed to cover the brush and prevent the escape of dust from the sweeper, and the lower pan is formed to provide on each side thereof two longitudinally-arranged sweepings-pans $b^2$.

C designates the supporting-wheels, which are suitably mounted at the ends of the frame in a manner to be hereinafter described; D, the rotative sweeping-brush, which is rotatively mounted at its ends in the end members of the frame; E, the bail, and E' the sweeper-handle, connected with the bail centrally thereof.

Figure 8:
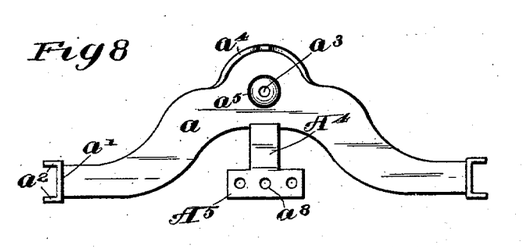
Fig. 8 is a view of one of the inner end members of the frame removed from the frame.

The frame A embraces two longitudinal side members A' A', which extend between and rigidly connect the transverse end portions of the frame. Said members are made of rigid metal strips. Said end portions of the frame are of duplex construction, each being made of inner and outer parallel separated parts $A^2 A^3$, between which are located the supporting-wheels C. The parts $A^3$ of said end members are formed by continuations of the strips constituting the side members, said strips being turned inwardly toward each other at the ends of the frame, but, as herein shown, do not meet. The inner members $A^2$ of the end portions of the frame are affixed rigidly to the side members $A'$ and end members $A^3$. The form of the inner members $A^2$ of the end portions of the frame is shown more clearly in Fig. 8. Said members are each made from sheet metal by a stamping operation and consists of a flat web $a$, which is vertically arched, as shown, and provided at its ends with lateral flanges $a'$ $a'$, which extend toward and have contact with the adjacent outer members $A^3$ of the frame and bear against the side members $A'$ thereof. Said flanges $a'$ serve to maintain the frame members $A^2$ $A^3$ properly spaced, and the members $A^2$ act as braces to transversely strengthen the frame. Said laterally-directed flanges $a'$ are provided with upper and lower lugs $a^2$ $a^2$, which embrace the side members $A'$ of the frame and hold said members $A^2$ from vertical displacement with respect to the side and end members of the frame. Said end members $A^2$ are each provided centrally thereof with an attaching-arm $A^4$, consisting of an upper horizontal part, which extends horizontally toward the outer member $A^3$ of the frame, and a vertical part, which is located inside the plane of said outer member $A^3$. Said vertical parts of the attaching-arms $A^4$ are horizontally elongated at their lower ends to form extensions $A^5$, to which the adjacent ends of the parts of the outer members $A^3$ of the end portions of the frame are attached by rivets $a^{15}$ or the like. Said attaching-arms $A^4$ afford a rigid connection between the central parts of the inner and outer end members of the frame. The said members $A^2$ are also provided above the attaching-arm $A^4$ with openings $a^3$ to receive the hooked ends $e$ of the bail.

Figure 9:
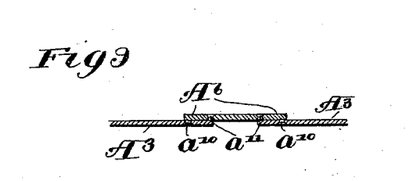
Fig. 9 is a modified form of the means for joining the strips constituting the side and end members of the frame.

It will be noted that in the construction just described the inner members of the end portions of the frame are each fixed in the frame by two rivets only, the interfitting connection of the lugs $a^2$ with the side members of the frame establishing a rigid connection of said parts. In Fig. 9 the lower end of the arm $A^4$ is provided with extensions $A^6$, corresponding with the extensions $A^5$, (shown in Fig. 8,) but instead of being provided with rivet-holes is provided with outwardly-directed lugs $a^{10}$, which fit in openings in the end member and are upset thereover. The extreme ends of the strips constituting the end members $A^3$ are formed to provide lugs $a^{11}$, which fit within openings in the extensions $A^6$ and are upset thereover. In this manner I am able to avoid the use of separate rivets.

Figure 17:
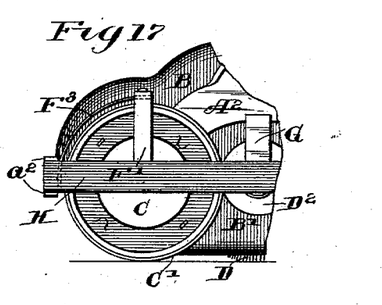
Fig. 17 illustrates a modified means of connecting the supporting-wheels with the frame.

The supporting-wheels C are shown in Figs. 1, 2, 5, and 6 as connected with the ends of the sweeper-frame through the medium of transversely-disposed bars F F, which are located above the space between the end members $A^2$ $A^3$ and parallel with said end members. Said bars are affixed centrally thereof to the attaching-arms $A^4$ of the inner members of the frame, being attached to the horizontal portion of said arms by rivets, screws, or the like. Attached to the outer ends of each bar are vertically-disposed forks F', which extend downwardly between the end members $A^2$ $A^3$ of the frame. Said forks each comprise parallel vertical arms connected at their upper ends by a transverse horizontal part, and the lower ends of said arms are provided with bearing-apertures which receive the oppositely-extending trunnions $c$ of the wheels. The bars F are attached to the horizontal parts of said forks by means of rivets or similar fastening means. Said bars F are preferably made of spring metal and have semi-elliptical form, and the resiliency of said bars provides a yielding connection of the wheels with the frame, whereby the frame may be slightly depressed relatively to the wheels to vary the pressure of the brush on the carpet. Instead of fastening both wheels at each end of the frame to the frame by a single spring-bar F, I may employ a separate bar $F^3$ for each wheel, as shown in Fig. 17. In this construction each bar $F^3$ is attached at its outer end to the frame between the end members and at its inner end to the horizontal part of its associated fork. The bars $F^3$ are preferably curved to conform to the curvature of the wheel and being located outside of the wheels constitute wheel-guards.

The core D' of the brush is provided at its ends with circular disks $D^2$, which have rolling contact with the peripheries of the wheels C, whereby the brush is driven through the medium of said supporting-wheels. Said wheels are preferably provided with yielding friction-producing tires C', made of rubber, leather, or the like, said tires constituting frictional engaging parts between the wheels and the disks of said brush-core. Said brush is removably supported in the frame, whereby the same may be detached therefrom when such detachment is desirable. The means for removably supporting said brush in the frame are made as follows: G G designate spring-metal plates overlying and fastened to the attaching-arms $A^4$ of the end members of the frame, said spring-arms conforming to the attaching-arms and affixed to said arms by means of the same rivets which attach the spring-metal bars F to the sweeper-frame, as herein shown. The lower ends of said spring-arms G carry inwardly-extending studs G', which are affixed thereto in any suitable manner and constitute trunnions for the brush-core, which enter sockets or recesses in bearing-blocks $D^3$, fitted in central sockets in the outer faces of the disks $D^2$ of the brush-core. Said studs G' extend through openings $a^8$ in the attaching-arms $A^4$, as clearly shown in Figs. 6 and 7. The lower ends of said spring-arms extend below the end frame members $A^2$ to afford projections which may be grasped by the fingers to withdraw the studs from the brush-core when it is desired to release the brush. The studs are held in bearing relation to the brush-core by the resiliency of the spring-arms G. The vertical parts of said spring-arms occupy the spaces between the adjacent ends of the strips constituting the end members $A^2$ of the frame, whereby said spring-arms are flush with said end members and provide non-projecting surfaces at these points.

Figure 16:
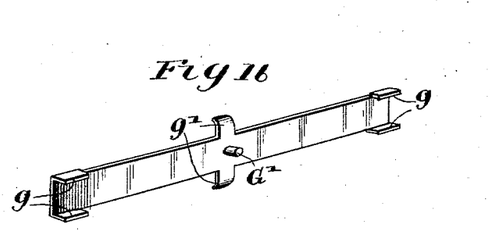
Fig. 16 is a perspective view of a modified means of securing the brush in the frame.

In lieu of the springs G for carrying the bearing-trunnions for the rollers I may employ straight flat spring-strips $G^2$, as shown in Fig. 16, adapted to fit outside of the outer end frame members and to be clasped thereto by lugs $g$ at the ends thereof. The bearing-trunnions G' are fixed to the strips centrally thereof. The strips are provided adjacent to the trunnion G' with laterally-curved lugs which afford finger-holds by which the central parts of the strips may be pulled outwardly from the frame to withdraw the bearing-trunnions G' from engagement with the brush-core.

Figure 1:
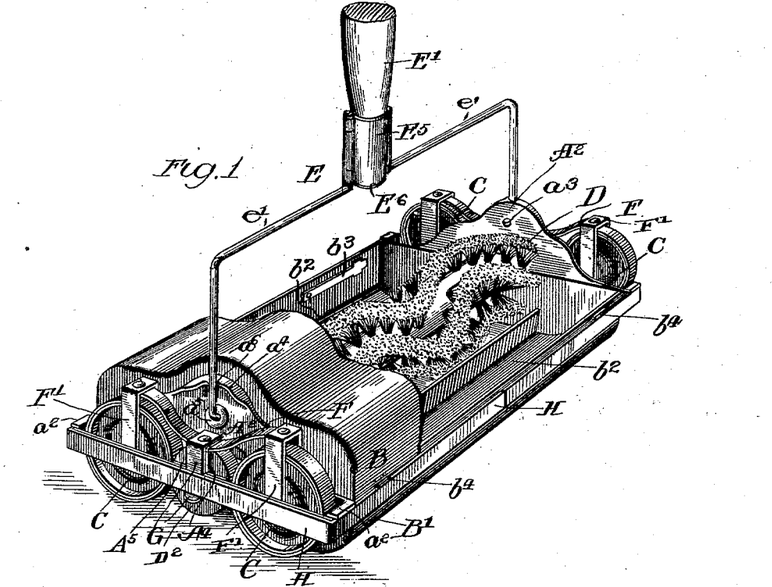
Figure 1 is a perspective view, with parts broken away, of a carpet-sweeper embodying my invention.
Figure 4:
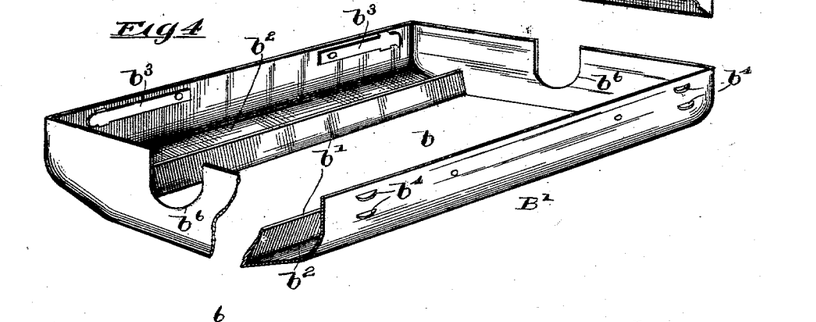
Figures 5, 7:
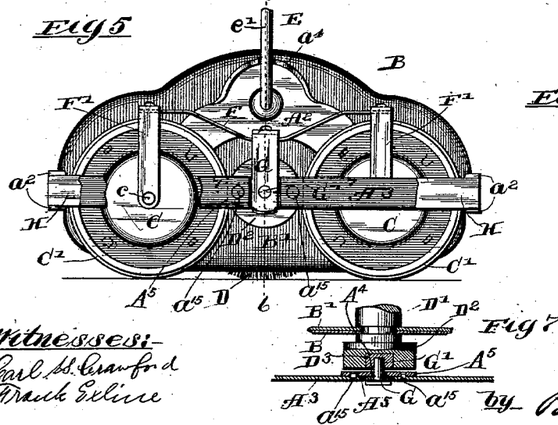
Fig. 5 is an end view of the machine with parts broken away.
Fig. 7 is a fragmentary horizontal section taken on line 7 7 of Fig. 5.
Figure 6:
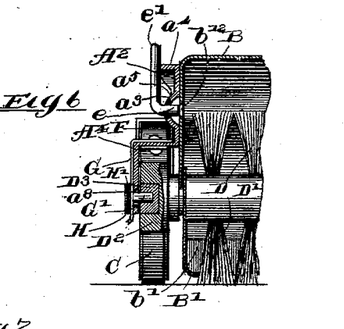
Fig. 6 is a fragmentary vertical section taken on line 6 6 of Fig. 5.
Figure 14:
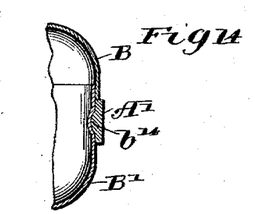
Fig. 14 illustrates a modification of the means for attaching the lower casing to the frame.
Figure 15:
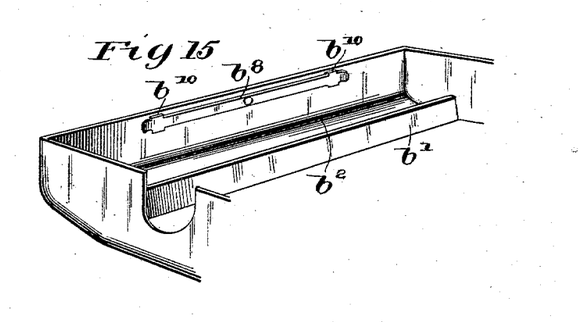
Fig. 15 is a further modification of said attaching means.

The upper and lower casings B B' are each preferably made from a single sheet of metal by suitable stamping operation. The casing B' is provided centrally thereof with a longitudinal opening $b$, as shown in Fig. 3, through which extends the brush for sweeping contact with the floor. The margins of the bottom of the casing B' are turned upwardly on each side of said opening to constitute outwardly and upwardly inclined flanges $b'$, between which and the side walls of the casing are formed the sweepings-pans $b^2$, which receive the sweepings from the brush. The casings B B' are made rectangular at their open sides to fit within the rectangular frame A. The lower casing is inserted into the frame from below and extends with its side and end margins above the level of the side members of the frame, as shown in Fig. 1. The upper casing fits at its open end over the upper margins of the lower casing at both its sides and ends, as herein shown, and the side margins of the upper casing abut against the upper margins of the side members of the frame. The end walls of the upper casing fit closely against the inner end members of the frame, and are thereby held longitudinally in place. Said casings are provided at the margins of their end walls with notches $b^5$ $b^6$, which fit over the brush-core, and preferably the core is provided with annular grooves, which receive the overlapping parts of the said end walls at said notches, as shown in Fig. 6. In this manner a dust-proof connection between the casings is provided. If the frictional contact between the lower casing and the frame members be not sufficient to hold the casing in place, said casing may be provided with attaching devices, which have interlocking connection with the frame in a manner to positively support the same on the frame. In Fig. 4 attaching devices are shown for this purpose, consisting of spring-strips $b^3$ $b^3$, two on each side of the pan adjacent to each corner thereof and each riveted at one end to the side wall of the pan. Said spring-strips are provided at their free ends with integral outwardly-directed vertically-separated lugs $b^4$, which extend through suitably-located openings in said side walls of the casing and embrace the side members of the frame. The free ends of the spring-strips $b^3$ are laterally curved to afford projections for manual engagement to facilitate the withdrawal of the lugs $b^4$ out of engagement with the side members of the frame and permit removal of the casing. In lieu of the two spring-strips $b^3$ for each side of the casing longer strips $b^8$ may be employed and centrally attached to the casing wall and provided at both ends with lugs $b^{10}$ for interlocking engagement with the side frame members, as shown in Fig. 15. The lower margins of the upper casing are provided with downwardly-opening notches $b^{11}$, which fit over the lugs $b^4$ when the casings are assembled. Another means for locking the lower casing to the frame is shown in Fig. 14, wherein the side members A' of the frame are provided with lugs $b^{14}$, which enter suitably-located notches in the side walls of said lower casing, near the upper margins thereof. The said upper and lower casings B B' are curved at the junction of the side and end walls with the top walls to within a short distance of the open margins of the casing, thereby giving an arched form to the walls, with the result of imparting thereto strength to withstand shocks to which the casings may be subjected.

The hooks $e$ of the bail are made of sufficient length to extend through the frame member $A^2$ and into openings $b^{12}$ in the adjacent end walls of the upper casing B, as shown in Figs. 3 and 6, whereby said casing is adapted to be locked by said hooks in said frame. The upper margins of said end members $A^2$ of the frame are provided centrally thereof with curved cam projections $a^4$, which extend laterally outwardly therefrom and are adapted to engage the parallel ends of the bail when the bail is thrown into a vertical position in a manner to force the ends of the bail away from each other and to withdraw the hooks $e$ of said bails from engagement with the end walls of the upper casing B. This feature of the construction permits the unlocking of the upper case from the frame when it is desired to remove said case. In the practical use of the sweeper, as will hereinafter more fully appear, the sweepings from the pans $b^2$ are dumped into the upper casing by inversion of the sweeper, and said upper casing is detached from the machine and serves as a receptacle to convey the sweepings from the sweeper. The ready removal of the upper casing from the sweeper becomes, therefore, important. The bail is made of resilient material, whereby when it is moved out of engagement with the cam projections $a^4$ the hooked ends of the bail spring into engagement with the apertures $b^{12}$ of the upper casing. In order to provide ample bearings for the hooked ends of the bails and which will prevent disengagement of said bail-hooks from the frame members $A^2$ when so withdrawn from the casing-walls, the openings $a^3$ in said frame members are formed in hollow protuberances $a^5$, as clearly shown in Fig. 6. The said curved cam projections $a^4$ are provided centrally thereof with notches $a^6$, which the parallel parts of the bail occupy when said bail is raised to a vertical position, so that in this manner the bail may be held in a vertical position, it being a desirable position for the bail to occupy when the sweeper is not in use. The side walls of said bail-receiving notches $a^6$ are inclined, so as to permit the bail to be turned either way from its vertical position by a sidewise pull on the bail or the handle, said inclined sides of the notches acting to spread the bail sufficiently to release the same from the notches.

The bail E may be made of any preferred or desired construction and is herein shown as made of two like parts $e'$, joined to the handle by a two-part metal ferrule $E^5$. Said bail and its connection with the handle are made the subject-matter of another application filed by me on the 26th day of December, 1902, Serial No. 136,604.

Figure 10:
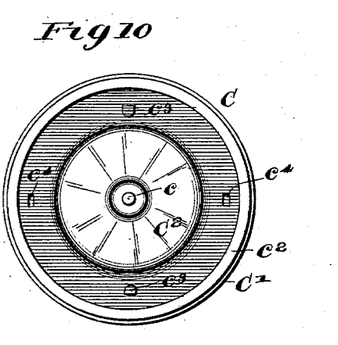
Figs. 10 and 11 are side elevation and axial section of the supporting-wheel for my improved carpet-sweeper.
Figure 11:
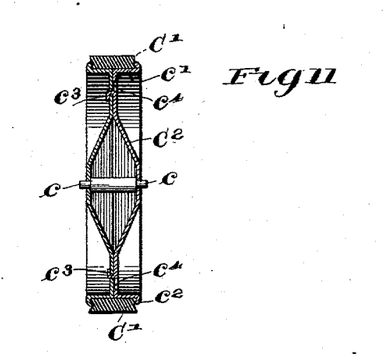

The wheels C are each made from two like sheet-metal parts which are formed by a suitable stamping operation and secured rigidly together. As herein shown, said wheels consist of two side parts $C^2 C^2$, each having on its periphery a lateral cylindric flange $c'$, which is provided at its outer margin with a narrow generally radial flange $c^2$, whereby when said halves of the wheel are united a peripheral groove is formed to receive the tire $C'$. The means for joining said halves of the wheels consist in striking up from each wheel member two lugs or spurs $c^3$ and two apertures $c^4$. The lugs or spurs $c^3$ of each half of the wheel are adapted to enter the apertures $c^4$ in the other half and to be clenched down over the webs of the wheel members in the manner clearly shown in Figs. 9 and 10. The flanges $c^2$, constituting the side walls of the tire-grooves of the wheels, are preferably turned slightly inwardly, and the tires $C'$ are seated in said grooves before the parts of the wheels are fastened together, so that when fastened together the flanges act to clamp the tires in place. The central parts of the webs of the wheel members are bent outwardly in opposite directions, as shown in Fig. 11, in a manner to stiffen the wheels, and the trunnion-shafts $c$ are provided with outwardly-facing shoulders against which said webs are pressed when the parts of the wheels are fastened together, whereby said trunnions are held fixedly in place and also possess the function of braces to impart rigidity to the wheels.

Figures 12, 13:
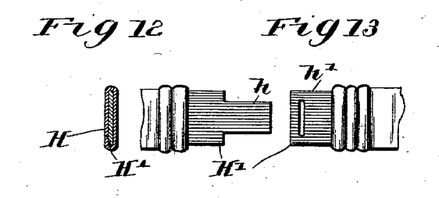
Fig. 12 is a cross-section of the buffer-strip.
Fig. 13 illustrates the manner of forming the ends of said buffer-strip.

A buffer-strip H surrounds the sweeper in horizontal alinement with the side and end frame members $A' A^3$. The construction of said buffer is shown more clearly in Figs. 12 and 13. As shown in said figures, the buffer consists of a hollow tube of rubber or the like cushioning material, which is provided with a substantially inextensible core $H'$. The tube is herein shown as made flat, and the core consists of a flat strip of metal. The metal strip $H'$ is employed to make the buffer as a whole inextensible, so that when once fitted to the sweeper it will not tend to stretch and fall away therefrom, as when made wholly of an elastic material, such as rubber. One end of said metal strip is provided with a tongue $h$, and the other end thereof is provided with a transverse loop $h'$, through which the tongue is adapted to be passed, and is folded in a manner to fasten said ends of the strip together. At the time the buffer is fastened to the casing the buffer-tube which incases the strip $H'$ is slipped backwardly to expose the tongue and the loop, as shown in Fig. 13, and after said parts have been fastened together said adjacent ends of the tube are brought together to make the buffer continuous. The lugs $a^2$, on the outer ends of the inner frame members $A^3$ extend beyond the side members of the frame and form at the corners of said frame sockets to receive and hold the cushioning-strip from vertical displacement.

The operation of the sweeper so far as the sweeping action thereof is concerned is in all respects similar to the operation of the various sweepers now in the market. When the sweepings-pans have become filled and it is desired to dump the sweepings from the sweeper, the position of the sweeper is reversed to permit the sweepings to fall into the upper casing B. Thereafter the said casing B is removed from the sweeper and serves as a pan to carry the sweepings to a suitable place for the disposal thereof. It will be observed, therefore, that in the ordinary use of the sweeper the lower casing $B'$ need not be removed from the frame. It is desirable, however, that the lower casing be detachably secured to the frame in order that it may be removed therefrom at times—for instance, when it is desired to remove the brush.

An important advantage of the construction described, in addition to those heretofore mentioned, is that nearly all of the metal parts of the sweeper may be made from sheet metal by suitable stamping and cutting operations, and said parts are joined by the use of but a few rivets, so that the cost of material from which the sweeper is made and the expense of assembling the parts thereof are greatly decreased as compared with sweepers made under the prevailing practice. Moreover, by reason of the construction of the main frame of the machine, which is rigid from end to end thereof and which carries at its ends the supporting-wheels, all pressure and strains brought upon the sweeper in the use thereof are taken by the frame and none are transmitted to the casings. The sweeper therefore possesses great durability, as the frame may be made as rigid as necessary to withstand the shocks and strains coming thereon in the use of the same, and the casing and other parts of the sweeper may be made of light material.

It is to be understood that my invention is not limited to the specific details of construction shown in the accompanying drawings, but that said details may be varied in the practical carrying out of my invention. It is also to be understood that the combinations specifically set forth in the several claims are intended to be separately claimed without limitation to the use in connection therewith of other features and details of construction illustrated.

I claim as my invention—

1. A carpet-sweeper comprising a rigid, continuous frame, supporting-wheels mounted in said frame, a bail pivoted to said frame, a sweeping-brush, means for rotating said brush and upper and lower casings supported on said frame, and having overlapping connection at their adjacent open sides, the lower casing being provided with an opening to permit the brush to extend therethrough, and constructed to provide at the side of said opening a sweepings-pan to receive the sweepings from the brush.

2. A carpet-sweeper comprising a rigid, continuous frame, supporting-wheels mounted in said frame, a bail pivoted to said frame, a sweeping-brush, means for rotating said brush, upper and lower casings supported on said frame, the lower casing being inserted into the frame from below and extending with its side margins above the level of the frame and the upper casing fitting over the upper margins of the lower casing, said lower casing being provided with a longitudinal opening to permit the brush to project therethrough and at the sides of the opening with sweepings-pans.

3. A carpet-sweeper comprising a rigid continuous frame, supporting-wheels mounted on the end members of said frame, a sweeping-brush, means for rotating said brush, and upper and lower casings which are shorter than the frame and are supported on the said frame between said wheels, said lower casing having connected side, bottom, and end walls and being connected at the upper margins of its side walls with the side members of the frame and being provided in its end walls with notches for the passage of the brush-core and in its bottom wall with a longitudinal opening for the passage of the brush, and also having at the sides of said opening sweepings-pans, and the upper part of the casing consisting of connected side, top and end walls and being seated at the lower margins of its side walls on the side members of the frame.

4. A carpet-sweeper comprising a rigid, continuous frame, supporting-wheels mounted in said frame, a bail pivoted to said frame, a sweeping-brush, means for rotating said brush, and upper and lower, horizontally-separable, casings mounted in said frame and having overlapping engagement at the margins of their open sides, said casings being provided at the margins of their end walls with notches to receive the brush-core and the lower casing being provided with a sweepings-pan to receive the sweepings from the brush.

5. A carpet-sweeper comprising a rigid, continuous frame, supporting-wheels therefor, a sweeping-brush, means for rotating said brush, upper and lower casings supported on said frame, the lower casing being provided with sweepings-pans to receive the sweepings from the brush, and the upper casing being removably seated on the frame, said sweepings-pan being located to permit the contents thereof to be dumped into the upper casing when the sweeper is inverted, whereby the upper casing may serve as a receptacle to carry the sweepings from the sweeper.

6. A carpet-sweeper comprising a rigid, continuous frame, supporting-wheels mounted in said frame, a sweeping-brush, means for rotating said brush, a bail pivoted to said frame, upper and lower casings supported on said frame and having overlapping engagement at their open margins, said casings being provided at the margins of their end walls with notches to receive the brush-core, and the brush-core being provided with annular grooves to receive the overlapping margins of the casings, and a sweepings-pan in said lower casing.

7. A carpet-sweeper comprising a frame consisting of connected side and end members, and having at each end two parallel end members, supporting-wheels for the frame mounted between said parallel end members, a sweeping-brush, means for rotating the brush, a sweepings-pan the upper margins of which are located within the side frame members and the innermost end frame members, and the side walls of which are attached to the side frame members and a removable casing covering said brush and pan and having its side walls seated at their lower edges on the said side members of said frame.

8. A carpet-sweeper comprising a frame, the side members which extend from end to end of the frame and provided at each end with inner and outer parallel end members, one of said parallel end members at each end of the frame being continuous with the side members, supporting-wheels located between said parallel end members, a sweeping-brush mounted in said frame, means for rotating the brush, a sweepings-pan which receives the sweepings from said brush, and a casing fitting over and closing the sweepings-pan, said casing being removably seated on said frame.

9. A carpet-sweeper comprising an open, continuous frame the side members of which extend from end to end thereof and provided at each end with inner and outer parallel end members, supporting-wheels mounted in the ends of the frame between said parallel end members, a sweeping-brush, means for rotating the brush, the inner end members extending between and being connected at their ends with the side members, and provided with attaching-arms which are connected with the outer end members, and a sweepings-pan adapted to receive sweepings from the brush.

10. A carpet-sweeper comprising an open, rigid frame, the side members of which extend from end to end of the frame and consist of flat metal strips, said side members being bent inwardly at the ends of the frame toward each other to constitute part of the end members of the frame, said end parts of the frame embracing also inner end members which are parallel with said inwardly-turned portions of said strips, the inner end members of the frame being connected at their ends with the side members of the frame and provided with attaching-arms which connect the adjacent ends of the inwardly-turned parts of said strips which constitute the outer end members, a sweeping-brush, means for rotating said brush, supporting-wheels mounted in the outer ends of said frame, and a sweepings-pan located in position to receive the sweepings from the brush.

11. A carpet-sweeper comprising an open rigid frame the side members of which extend from end to end of the sweeper, and provided at each end with parallel inner and outer members, a sweeping-brush, means for rotating said brush, two supporting-wheels located between said inner and outer members at each end of the frame, a single spring-bar at each end of the frame and attached centrally thereof to a part connected with said inner and outer members, said wheels at each end of the frame being rotatively mounted on parts attached to the opposite ends of the associated spring-bar and a sweepings-pan located in position to receive the sweepings from the brush.

12. A carpet-sweeper comprising an open frame, the side members of which extend from end to end thereof, two supporting-wheels at each end of the frame, a single spring-bar at each end of the frame and attached centrally thereof to said frame, forks connected with the opposite ends of each spring-bar in which forks said wheels are rotatively mounted, a sweeping-brush, means for rotating the brush, and a sweepings-pan located in position to receive the sweepings from the brush.

13. A carpet-sweeper comprising an open metal frame, the side members of which extend from end to end of the frame, and provided at each end with inner and outer parallel end members, the inner members of which extend between and are connected with the side members thereof, and are provided with outwardly-directed attaching-arms which are connected with the outer end members, spring-bars affixed centrally thereof to said attaching-arms, vertical forks attached to the ends of said bars, supporting-wheels rotatively mounted between the arms of said forks, a sweeping-brush, means for rotating said brush, and a sweepings-pan located in position to receive the sweepings from the brush.

14. A carpet-sweeper comprising an open frame, supporting-wheels connected with said frame, a sweeping-brush, means for rotating said brush, a sweepings-pan, a removable upper casing, and a bail provided with hooked ends which extend through registering apertures in the end members of the frame and the end walls of the upper casing, whereby said upper casing is locked to the frame.

15. A carpet-sweeper comprising an open frame, supporting-wheels connected with said frame, a sweeping-brush, means for rotating said brush, a sweepings-pan, an upper casing which is removably seated on said frame, a bail provided with hooked ends which extend through registering apertures in the end members of the frame and the end walls of the upper casing, whereby said upper casing is locked to the frame, and means acting, when the bail is swung on its pivot, to withdraw the hooked ends thereof out of engagement with said casing-walls.

16. A carpet-sweeper comprising an open frame, supporting-wheels connected with said frame, a sweeping-brush, means for rotating said brush, a sweepings-pan, an upper casing which is removably seated on said frame, a bail provided with hooked ends which extend through registering apertures in the end members of the frame and the end walls of the upper casing, whereby said upper casing is locked to the frame, and curved cam projections on said frame adapted, when said bail is swung on its pivot, to engage the bail ends to spread the same outwardly and to thereby release the hooked ends thereof from the casing-walls.

17. A carpet-sweeper comprising an open frame, supporting-wheels connected with said frame, a sweeping-brush, means for rotating said brush, a sweepings-pan, an upper casing removably seated on said frame, a bail provided with hooked ends which extend through registering apertures in said frame and the end walls of the upper casing, whereby said upper casing is locked to the frame, and curved cam projections located centrally of the end members of the frame and adapted to engage the bail, when the latter is swung from a vertical position, to force the end members thereof outwardly and to thereby withdraw the hooks from engagement with the end walls of the casing, said cam projections being provided with notches adapted to be engaged by the bail ends when the bail reaches a vertical position to hold said bail in such position.

18. A carpet-sweeper comprising a frame, supporting-wheels connected with the frame, a sweeping-brush, means for rotating said brush, a sweepings-pan, an upper casing removably seated on the frame, a bail provided with hooked ends which extend through registering apertures in the end members of the frame and the end walls of the upper casing, and means for spreading the bail ends outwardly to withdraw the hooked ends thereof from the apertures of the upper-casing wall, said end walls of the upper casing fitting closely against the end members of the frame, and the bail-apertures of said end members of the frame being formed in outwardly-directed protuberances.

19. A carpet-sweeper comprising an open frame, provided at its ends with supporting-wheels, a sweeping-brush, means for rotating the brush, upper and lower casings removably seated on said frame, the lower one of which is inserted into the frame from below and provided with a sweepings-pan to receive the sweepings from the brush, and interfitting connections between the walls of the lower casing and the members of the frame constructed to permit detachment of the casing from the frame.

20. A carpet-sweeper comprising an open frame, provided at its end with supporting-wheels, a sweeping-brush, means for rotating said brush, horizontally-separable, upper and lower casings, the lower one of which is inserted into the frame from below and provided with a sweepings-pan to receive the sweepings from the brush, interfitting connections between the side walls of the lower casing and the members of the frame, the margins of the lower casing extending above the side members of the frame, and the upper casing fitting with its margins over the margins of the lower casing and abutting against the upper margins of the side members of the frame.

21. A carpet-sweeper comprising an open frame provided with longitudinal side members and transverse end members, supporting-wheels rotatively mounted in parts connected with the ends of said frame, a sweeping-brush, means for rotating said brush, horizontally-separable upper and lower casings, the lower one of which is formed to provide a sweepings-pan to receive the sweepings from the brush, a spring-strip attached to the inner sides of the walls of the lower casing and provided with lugs adapted to extend through openings in said walls and engage the adjacent side members of the frame for holding the casing in the frame, the upper casing fitting between the end members of the frame and overlapping the inner margins of the lower casing.

22. A carpet-sweeper comprising an open frame having side members which extend from end to end of the frame, and the end portions of which consist of parallel, inner and outer members, the inner members of which are connected with the side members and provided centrally thereof with attaching-arms which are affixed to the outer end members, a rotative brush extending between said end members, means for rotating said brush, spring-pressed arms affixed to said attaching-arms and provided at their lower ends with inwardly-directed studs which engage bearing-sockets in the ends of the brush-core and are held engaged therewith by the resiliency of the spring-arms, and a sweepings-pan located in position to receive the sweepings from the brush.

23. The combination with a carpet-sweeper, of a cushioning-buffer extending around the same, comprising a cushioning-tube, and a thin, flat, metal band inclosed in said tube, said band being provided at one end with a tongue and at its other end with a slot to receive said tongue, whereby said ends of the band may be fastened together.

In testimony that I claim the foregoing as my invention I affix my signature, in presence of two witnesses, this 12th day of September, A. D. 1902.

THOMAS I. DUFFY.

Witnesses:
WILLIAM L. HALL,
CARL H. CRAWFORD.